United States Patent [19]
Töpfer et al.

[11] Patent Number: 5,537,965
[45] Date of Patent: Jul. 23, 1996

[54] INTAKE SYSTEM FOR AN INTERNAL-COMBUSTION ENGINE

[75] Inventors: Walter Töpfer, Iptingen; Franz Eberle, Stuttgart; Dietmar Krüger, Friolzheim; Norbert Kleinehakenkamp, Weissach, all of Germany; Michail I. Fesina, Togliatti, Russian Federation; Rudolf N. Starobinskij, Togliatti, Russian Federation; Jurij P. Lasarev, Togliatti, Russian Federation; Evgenij V. Lysenko, Togliatti, Russian Federation

[73] Assignees: Dr. Ing. h.c.F. Porsche, AG, Weissach, Germany; Avto-WAZ Volga Automobile Associated Works, Togliatti, Russian Federation

[21] Appl. No.: 387,910
[22] PCT Filed: Aug. 22, 1992
[86] PCT No.: PCT/EP92/01928
  § 371 Date: Jul. 7, 1995
  § 102(e) Date: Jul. 7, 1995
[87] PCT Pub. No.: WO94/04814
  PCT Pub. Date: Mar. 3, 1994
[51] Int. Cl.⁶ .................................................. F02M 35/10
[52] U.S. Cl. .................... 123/184.42; 123/184.47
[58] Field of Search .................... 123/184.38, 184.42, 123/184.47, 184.53

[56] References Cited

U.S. PATENT DOCUMENTS

| | | | |
|---|---|---|---|
| 1,818,283 | 8/1931 | Spencer | 123/184.38 |
| 2,740,389 | 4/1956 | Reyl | 123/184.42 |
| 4,064,696 | 12/1977 | Cser | 123/184.42 |
| 4,543,918 | 10/1985 | Ma | 123/184.42 |
| 4,640,256 | 2/1987 | Conrad et al. | 123/184.38 |

FOREIGN PATENT DOCUMENTS

| | | | |
|---|---|---|---|
| 510261 | 10/1930 | Germany . | |
| 1238718 | 4/1967 | Germany | 123/184.38 |
| 2527774 | 12/1976 | Germany . | |
| 3219699 | 12/1983 | Germany . | |
| 3742057 | 9/1988 | Germany . | |
| 4035016 | 5/1991 | Germany . | |
| 968494 | 10/1982 | U.S.S.R. | 123/184.53 |

*Primary Examiner*—David A. Okonsky
*Attorney, Agent, or Firm*—Evenson McKeown Edwards & Lenahan

[57] ABSTRACT

An intake system for an internal-combustion engine, having a suction manifold comprising a chamber, has an intake connection on the inflow side and several individual suction pipes on the outflow side, which suction pipes lead into a cylinder head of the internal-combustion engine and are connected with the individual cylinders. The intake connection has an air guiding device which extends approximately to a plane extending between the two center suction pipes, and a wall of the air guiding device directed toward the interior openings of the suction pipes is arranged at a distance from these openings.

11 Claims, 4 Drawing Sheets

INTAKE SYSTEM FOR AN INTERNAL-COMBUSTION ENGINE

BACKGROUND AND SUMMARY OF THE INVENTION

The invention relates to an intake system for an internal-combustion engine having a suction manifold which comprises a chamber and which, on the inflow side, has an intake connection and, on the outflow side, has several individual suction pipes which lead into a cylinder head of the internal-combustion engine and are connected with the individual cylinders.

Because of a variable rate of air flow to the individual cylinders of the internal-combustion engine, airborne noises occur in an intake system which are transmitted to the outside by way of the chamber of the system and represent a deterioration of comfort.

It is an object of the invention to provide an intake system for an internal-combustion engine which causes a reduction of the airborne noises.

According to the invention, this object is achieved by providing an intake system of the above-noted type, characterized in that the intake connection has an air guiding device which extends approximately to a plane which extends between the two center suction pipes enclosed by the outer suction pipes and in the axial direction of the individual suction pipes and a wall of the air guiding device directed toward the interior openings of the suction pipes is arranged at a distance from these openings.

For reducing airborne noises, an air guiding device is arranged in the chamber of the intake system which is connected or arranged with the intake connection. As a result, the taken-in air is guided in a forced manner in the area of the two first cylinder intake pipes. The device may be constructed in one piece with the chamber, in which case an interior wall will then extend at a distance from the inlet openings of the suction pipes.

Additional embodiments contain inserted pipes which are connected with the pipe socket of the chamber by way of special fastening devices and project into it in an open manner.

The pipe consists of a plastic material and is subjected to thermal stress because of the relatively high wall temperature of the chamber of approximately 150° C. which causes the plastic material to soften and the hold in the intake connection ms therefore reduced.

During the cooling of the internal-combustion engine after the stoppage, the softened plastic material of the pipe wall will harden again. In the case of numerous softening and hardening processes of the pipe, which corresponds to a normal operation of the internal-combustion engine, as well as in the case of high vibration stress to which the components are subjected during the engine operation, a gap is formed at the connecting point between the pipe and the chamber which may lead to the destruction of the pipe.

In order to avoid this disadvantage, an annular groove is provided in the pipe into which a spring ring is inserted. In the area of the spring ring, the pipe wall has a thickening so that, when the pipe is heated, the spring groove can radially expand without any loss of stability and takes up a position in which it rests against a corresponding annular slot, and a secure fastening is therefore ensured.

According to the other embodiments, in addition to the axial securing, a rotational securing is also provided between the intake connection and the pipe. This rotational securing consists essentially of a raised pressed-out portion which extends in the axial direction of the pipe and which engages in a corresponding pressed-out portion of the connection.

Other objects, advantages and novel features of the present invention will become apparent from the following detailed description of the invention when considered in conjunction with the accompanying drawings.

DETAILED DESCRIPTION OF THE DRAWINGS

Figure 1:
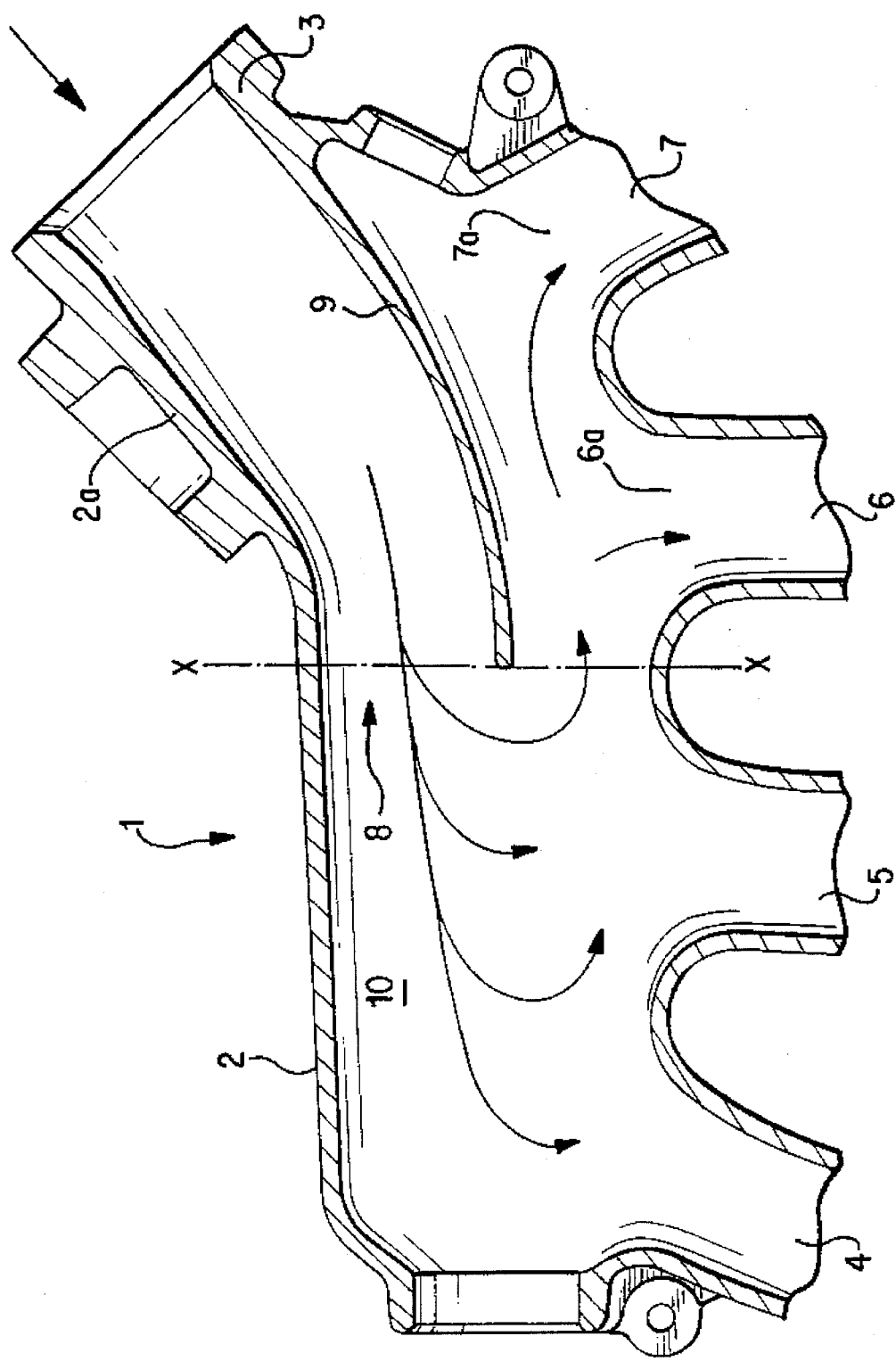
FIG. 1 is a view of a first embodiment of an air guiding device in a one-piece construction with the intake chamber.

An intake system 1 is connected with the cylinder head of an internal-combustion engine. This intake system 1 consists essentially of a chamber 2 with an intake connection 3 and individual suction pipes 4, 5, 6 and 7 which lead into the cylinder head and are fluidically connected with the individual cylinders of the internal-combustion engine.

The air guiding device 8 in the chamber 2 comprises a guiding wall 9 which is cast to the intake connection 3 and which extends in the interior 10 of the chamber 2 approximately into a plane X—X between the suction pipes 4 to 7. This guiding wall 9 virtually forms a pipe with the exterior wall 2a of the chamber 2, in which case the interior wall 9 is arranged at a distance to the inlet openings 6a and 7a so that an air supply becomes possible according to the drawn arrows.

Figure 2:
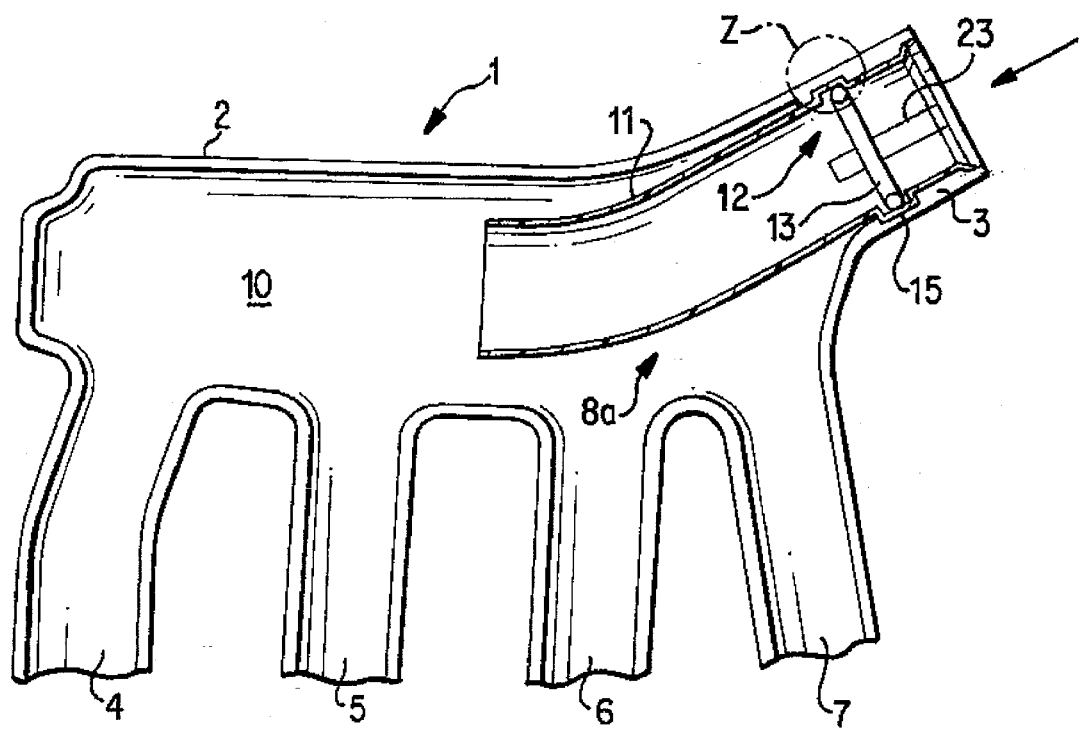
FIG. 2 is a view of another embodiment of an air guiding device consisting of a pipe with fastening devices.
Figure 3:
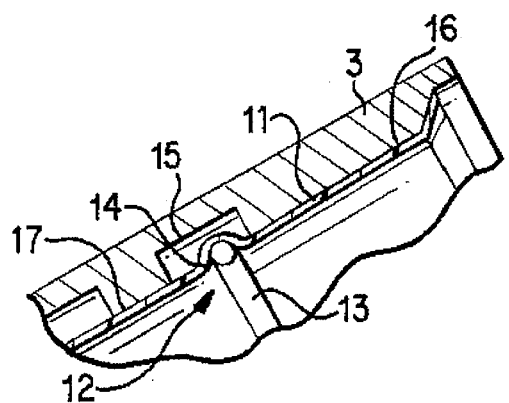
FIG. 3 is a view of an enlarged detail Z of the annular groove with the annular slot and the spring ring in a prestressed condition of the annular groove.
Figure 4:
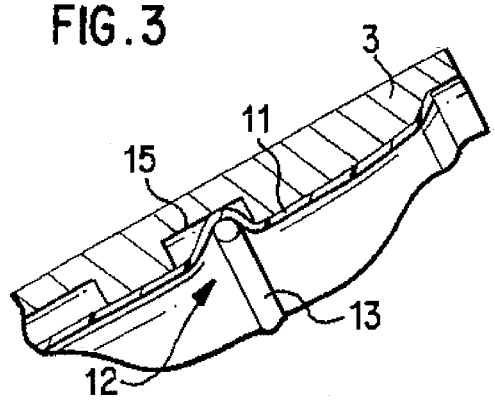
FIG. 4 is a view of a detail Z in a relaxed condition of the annular groove.
Figure 5:
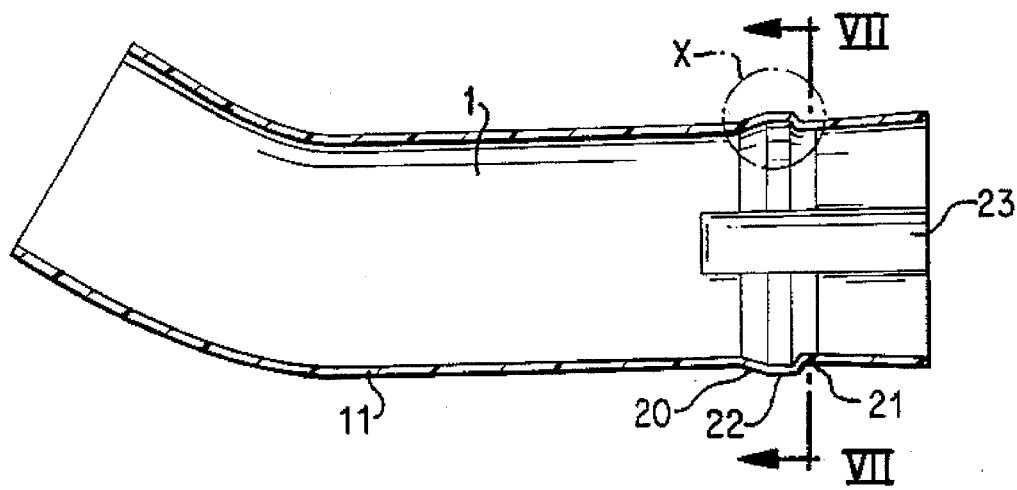
FIG. 5 is a view of another embodiment of a pipe with an axial and rotational securing of the pipe in the intake connection.
Figure 6:
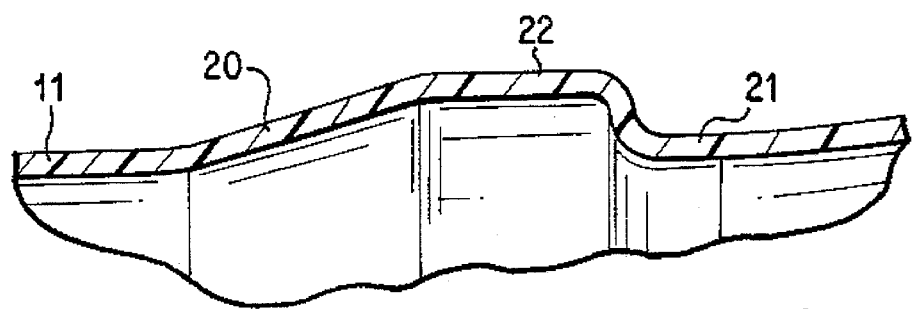
FIG. 6 is an enlarged detail X of the fastening area of the pipe.
Figure 7:
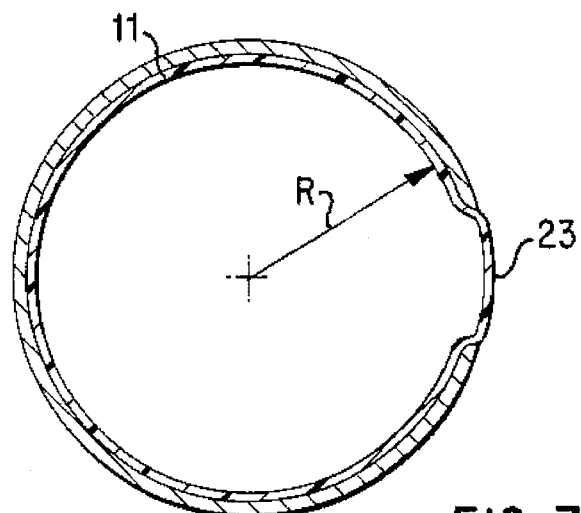
FIG. 7 is a sectional view according to Line VII—VII of FIG. 5.
Figure 8:
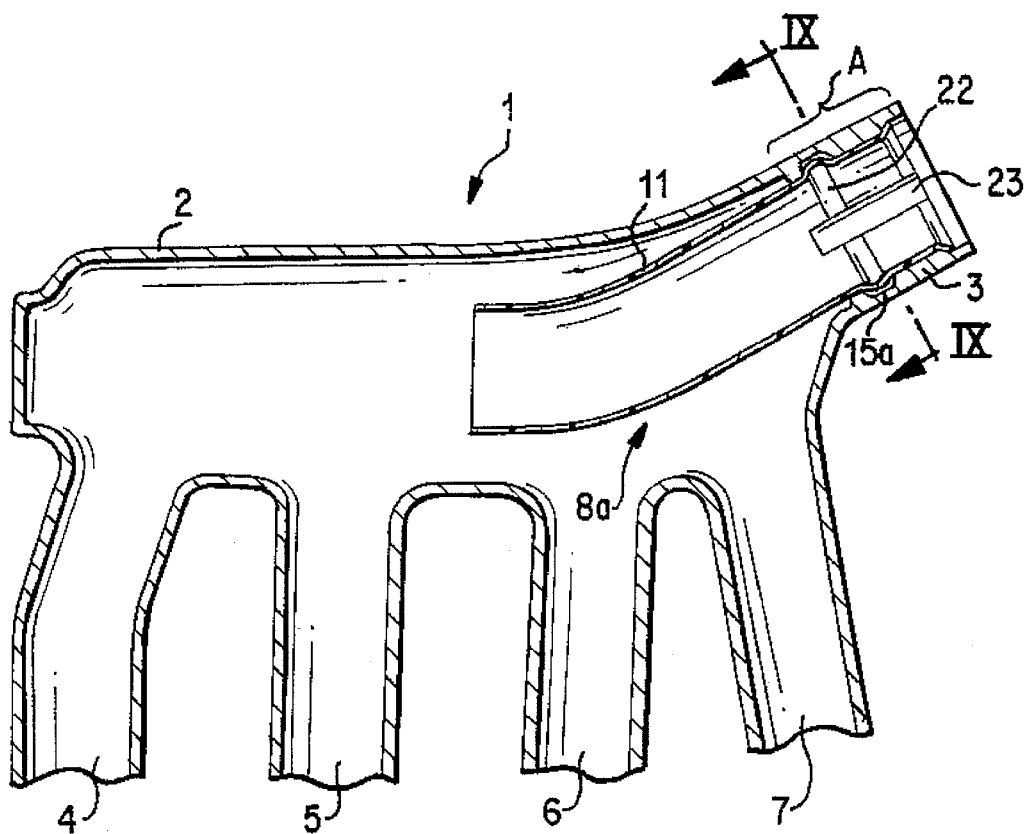
FIG. 8 is a view of the intake chamber with the inserted pipe in the intake connection.

According to another embodiment according to FIGS. 2 to 4, the air guiding device 8a consists of an inserted pipe 11 which is fixed in the axial direction in the intake connection 3 of the chamber 2 by way of a fastening device 12. This fastening device 12 consists of a spring ring 13 and is held in an annular groove 14 of the pipe 11, which annular groove is arranged to be corresponding with an annular slot 15 in the connection 3.

In the area of the annular groove 14, a material thickening is provided so that, in the heated condition of the pipe 11, as a result of the radial tensioning force of the spring ring 13, the annular groove 14 is deformed into the annular slot 15 so that it rests against it. A plane support of the pipe 11 held in the intake connection 3 takes place by way of the interior wall surfaces 16 and 17 of the connection 3 which extend on both sides of the annular slot 15.

At the start and during the operation of the internal-combustion engine, the air flows through the intake connection 3, the pipe 11 into the interior 10 of the chamber 2 and further, by way of the suction pipes 4, 5, 6 and 7, to the intake valves and then into the cylinders of the engine. The air, which moves in this case, cools the area of the pipe 11 in that the surfaces 16 and 17 and the annular slot 15 are subjected to the flow, whereby the temperature-caused deformation of the plastic wall of the pipe 11 is prevented, irrespective of the high wall temperature of the chamber 2.

After the stoppage of the engine, the temperature of the chamber wall, among others, also of the surfaces 16 and 17, will rise because of the heat transfer from other engine components which are heated more than the chamber 2, such as the exhaust collector, the damper suction pipe. The heat transfer from the chamber wall into the air present in it is unimportant because there is no air movement as the result of the engine stoppage.

Under these conditions, the pipe wall will soften at the contact points with the chamber wall, whereby the radial force, by which the pipe was held in the connection 3 of the chamber 2, will be diminished at these points. At the same time, the spring ring 13 which is inserted into the annular groove 14 and has a radial force will deform this annular groove 14 which is then moved against the annular slot 15 and assumes the configuration according to FIG. 4.

After the cooling of the engine, the plastic wall of the pipe 11 will harden but the radial force between the base of the annular slot 15 and the exterior surface of the annular groove 14 will remain because of the spring ring. The heating and cooling cycles of the plastic wall of the pipe 11 do not reduce the radial force between the interior wall of the connection 3 and the pipe 11 toward the interior wall surface 16 and 17. The reason is that the spring ring 13 will always press the deformed annular groove 14 against the annular slot 15. In addition, the secure fastening of the pipe 11 in the connection 3 of the chamber 2 in the axial direction is increased because of the larger diameter of the annular groove 14.

According to another embodiment of FIGS. 5 to 9, an air guiding device 8a consisting of a pipe 11, as in the embodiment according to FIG. 2 is used with the intake connection 3 and is held pressed in by way of a cylindrical fit in the axial direction.

The pipe 11 has a conical inlet part 20, a cylindrical fitting part 21 and an expanding annular groove 22 which protects against axial displacements. In the wall of the pipe 11, a pressed-out portion 23 is formed which is raised toward the outside and which intersects with the annular groove 22 in the axial direction.

Figure 9:
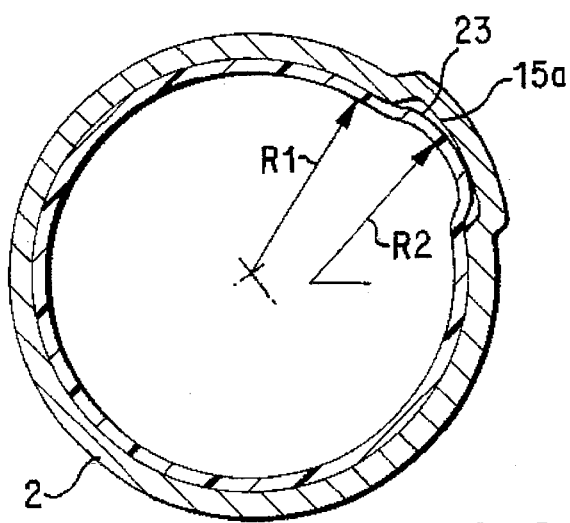
FIG. 9 is a sectional view according to Line IX—IX according to FIG. 8.

Before the pipe 11 is installed into the chamber 2 or into the connection 3, the surface of the pressed-out portion 23 has the same distance to the interior surface of the cylindrical connection 3 with the radius R. After the force-related installation of the pipe 11 into the chamber 2 (FIGS. 8 and 9), the cylindrical interior surface of the connection 3 in the area of the fit will then have a radius<R and the radius of the pipe 11 will decrease to R1 (FIG. 9). The compensation of the excess length on the circumference will in this case occur in the area of the pressed-out portion 23 which will then assume a bulging with the radius R2.

In the wall of the chamber, an annular slot 15a is formed for receiving the pressed-out portion 23 after the installation of the pipe 11 into the connection 3. Related to the fact that the largest force during the mounting of the pipe 11 into the connection 3 occurs when passing through the expanding annular groove 22 on the connection surface before the installation of the pipe 11 into the cylindrical fit 21, the pressed-out portion 23 intersects the expanding annular groove 22 in the axial direction, whereby a positive effect is achieved with respect to a secure fastening of the pipe 11 and its mounting in the interior of the chamber.

The embodiment according to FIG. 2, in which the axial securing takes place by way of the spring ring 13, may also have a rotational securing with an axially extending pressed-out portion 23 which engages in an axial slot 15a, as indicated in detail by the embodiment according to FIG. 9.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An intake system for an internal combustion engine comprising:

a suction manifold chamber, an atmospheric air intake connection on an inlet side of the chamber, a plurality of suction pipes on an outflow side of the chamber which lead into a cylinder head and are connected to respective individual engine cylinders, and an air guiding device at the intake connection which extends into the chamber approximately to a plane disposed between two centrally disposed ones of the suction pipes, an interior wall of the air guiding device facing toward and spaced from inlet openings of the suction pipes disposed at a guiding device side of said plane.

2. An intake system according to claim 1, wherein the air guiding device comprises a cylindrical air guiding element formed as a cast one-piece component with the intake connection, said air guiding element having an exterior wall portion formed by an inside wall of the chamber.

3. An intake system according to claim 1, wherein the air guiding device consists of a plastic pipe which is connected with the intake connection by way of a fastening device for an axial securing and which is held fitted into a pipe socket of the intake connection by means of a cylindrical section and projects by means of its end facing away from this cylindrical section into the chamber interior freely with respect to the chamber walls.

4. An intake system according to claim 3, wherein the fastening device consists of a spring ring which engages in an annular groove of the plastic pipe, which annular groove is arranged so that it corresponds with an annular slot in the intake connection.

5. An intake system according to claim 4, wherein the plastic pipe has a material thickening in the receiving area of the spring ring in the annular groove and which can be deformed in the heated condition of the pipe by the spring ring in a radially expanding manner and to rest against the base of the annular slot.

6. An intake system according to claim 3, wherein a pipe section of the plastic pipe fitted into the intake connection has a rotational securing arrangement which consists of a pressed-out portion which extends in the axial direction of the plastic pipe and which is arranged in an axial slot of the intake connection.

7. An intake system according to claim 4, wherein a pipe section of the plastic pipe fitted into the intake connection has a rotational securing arrangement which consists of a pressed-out portion which extends in the axial direction of the plastic pipe and which is arranged in an axial slot of the intake connection.

8. An intake system according to claim 5, wherein a pipe section of the plastic pipe fitted into the intake connection has a rotational securing arrangement which consists of a pressed-out portion which extends in the axial direction of the plastic pipe and which is arranged in an axial slot of the intake connection.

9. An intake system according to claim 6, wherein the fitted-in pipe section has a conical inflow part with an adjoining ring groove which is expanded toward the outside and intersects with a pressed-out portion extending in the axial pipe direction, which pressed-out portion is arranged so that it corresponds with the axial slot in the intake connection.

10. An intake system according to claim 7, wherein the fitted-in pipe section has a conical inflow part with an adjoining ring groove which is expanded toward the outside and intersects with a pressed-out portion extending in the axial pipe direction, which pressed-out portion is arranged so that it corresponds with the axial slot in the intake connection.

11. An intake system according to claim 8, wherein the fitted-in pipe section has a conical inflow part with an adjoining ring groove which is expanded toward the outside and intersects with a pressed-out portion extending in the axial pipe direction, which pressed-out portion is arranged so that it corresponds with the axial slot in the intake connection.

* * * * *